(12) United States Patent
Herold

(10) Patent No.: US 10,344,873 B2
(45) Date of Patent: Jul. 9, 2019

(54) CONTROL OR SHUTOFF VALVE

(71) Applicant: VAG—ARMATUREN GMBH, Mannheim (DE)

(72) Inventor: Heribert Herold, Mannheim (DE)

(73) Assignee: VAG—ARMATUREN GMBH, Mannheim (DE)

( * ) Notice: Subject to any disclaimer, the term of this patent is extended or adjusted under 35 U.S.C. 154(b) by 0 days.

(21) Appl. No.: 15/426,180

(22) Filed: Feb. 7, 2017

(65) Prior Publication Data
US 2017/0227131 A1  Aug. 10, 2017

(30) Foreign Application Priority Data

Feb. 10, 2016  (DE) .......................... 10 2016 102 252

(51) Int. Cl.
| | |
|---|---|
| *F16K 1/12* | (2006.01) |
| *F16K 1/54* | (2006.01) |
| *F16K 3/24* | (2006.01) |
| *F16K 31/60* | (2006.01) |
| *F16K 47/08* | (2006.01) |
| *F16K 1/42* | (2006.01) |
| *F16K 5/20* | (2006.01) |
| *F16J 15/34* | (2006.01) |
| *F16K 47/04* | (2006.01) |

(52) U.S. Cl.
CPC .................. *F16K 1/54* (2013.01); *F16K 1/12* (2013.01); *F16K 1/42* (2013.01); *F16K 3/246* (2013.01); *F16K 31/60* (2013.01); *F16K 47/08* (2013.01); *F16J 15/3448* (2013.01); *F16K 5/201* (2013.01); *F16K 47/04* (2013.01)

(58) Field of Classification Search
CPC .......... F16K 3/246; F16K 31/60; F16K 47/08; F16K 47/04; F16K 5/201; F16K 1/54; F16K 1/42; F16K 1/12; F16J 15/3448; Y10T 137/3476; Y10T 137/3421; Y10T 137/353
USPC ......................................... 137/222
See application file for complete search history.

(56) References Cited

U.S. PATENT DOCUMENTS

| | | | | |
|---|---|---|---|---|
| 2,679,856 A | * | 6/1954 | Gerritsen ................ | F16K 31/38 137/221 |
| 3,589,676 A | * | 6/1971 | Erickson ................... | F16K 1/42 251/172 |
| 3,945,393 A | * | 3/1976 | Teatini .................... | F16K 1/126 137/220 |

(Continued)

FOREIGN PATENT DOCUMENTS

| | | |
|---|---|---|
| DE | 712163 C | 10/1941 |
| DE | 919570 C | 10/1954 |

(Continued)

OTHER PUBLICATIONS

Result of examination report for German Application No. 10 2016 102 252.7 dated Feb. 10, 2016.

*Primary Examiner* — Matthew W Jellett
*Assistant Examiner* — Christopher D Ballman
(74) *Attorney, Agent, or Firm* — Paul D. Bianco; Katharine Davis; Fleit Gibbons Gutman Bongini & Bianco PL

(57) ABSTRACT

A control or shutoff valve with a housing includes a valve seat arranged within housing between feed and a discharge, and a shutoff element arranged to be moveable relative to the valve seat in the housing. At least one feed channel leading to the valve seat is arranged in the housing to supply a pressure medium to reduce cavitation phenomena.

14 Claims, 7 Drawing Sheets

(56) References Cited

U.S. PATENT DOCUMENTS

| | | | | |
|---|---|---|---|---|
| 4,167,262 A * | 9/1979 | Lemmon | ............... | F16K 31/363 |
| | | | | 137/487.5 |
| 4,565,210 A * | 1/1986 | Heine | ....................... | F16K 1/12 |
| | | | | 137/219 |
| 6,260,531 B1 * | 7/2001 | Haan | ........................ | F01L 3/02 |
| | | | | 123/188.8 |
| 8,322,373 B2 * | 12/2012 | Bey | .......................... | F16K 1/12 |
| | | | | 137/625.38 |
| 8,656,941 B1 * | 2/2014 | Hayward | ................... | F02K 9/58 |
| | | | | 137/221 |
| 9,766,632 B2 * | 9/2017 | Volovec | ................. | G05D 7/014 |
| 2012/0167987 A1 * | 7/2012 | Balan | ................... | F16J 15/3452 |
| | | | | 137/1 |
| 2012/0228537 A1 * | 9/2012 | Kahn | .................... | F16K 3/0227 |
| | | | | 251/328 |
| 2015/0377366 A1 * | 12/2015 | Hartman | ................ | F16K 5/205 |
| | | | | 251/180 |

FOREIGN PATENT DOCUMENTS

| | | |
|---|---|---|
| DE | 1020642 B | 12/1957 |
| DE | 1269136 B | 5/1968 |
| DE | 7325078 U | 6/1975 |
| GB | 520647 A1 | 4/1940 |

* cited by examiner

CONTROL OR SHUTOFF VALVE

FIELD OF THE INVENTION

The invention concerns a control or shutoff valve.

BACKGROUND

Such a control or shutoff valve is known from U.S. Pat. No. 2,679,856 A. It has a housing, a valve seat arranged within the housing and a closure element arranged within the housing to be adjustable relative to the valve seat to form a throttling site. A feed channel leading to the valve seat to supply a pressure medium is also provided in the housing. The feed channel formed by a longitudinal groove and a radial channel in an inner housing part leads to a single opening that discharges downstream of the valve seat.

A valve with a valve seat arranged in a housing and a closure element arranged within the housing to be adjustable relative to the valve seat is disclosed in published patent application GB 520 647 A. The valve is formed here by two annular components, between which an annular space is delimited. Water can be introduced into the annular space via a feed line in the housing and via an annular channel and radial holes. However, this annular space discharges downstream of the valve seat for the closure element situated in a closed position.

The valve seat in a steam converting valve disclosed in published application DE 1 269 136 A has steam removal openings positioned concentric to a valve closure element, which is connected via auxiliary steam lines to injection nozzles positioned on the valve outflow side.

DE 1 020 642 A discloses a pressure-reducing control valve in which several channels distributed around the periphery are provided for injection of cooling water at a constriction site of a housing.

A ring nozzle is arranged behind the throttling site in a pressure-reducing valve known from DE 919 570 B.

A valve with a double-walled outflow channel is disclosed in DE 73 25 078 U. The main stream here is enclosed by an oppositely running secondary stream via the annular cavity formed thereby.

A valve in which fine, oblique atomization channels are arranged in the valve seat to form an atomizer is known from DE 712 163.

In the control valves used in the bottom outlets of dams, air is drawn into the pipeline arranged downstream to reduce cavitation. This is made possible by mounting ventilation parts at the outlet of the control valve. Air, which increases the pressure in the throttling gap and reduces the tendency toward cavitation, is drawn in via the partial vacuum on the throttling gap. However, this is only applicable in short pipelines downstream. As soon as the backpressure rises too strongly on the valve, air is no longer drawn in and cavitation is therefore no longer suppressed.

The drawing in of air is not applicable in closed pipeline systems with low backpressure, since the air here leads to undesired pressure fluctuations. In order to reduce cavitation in closed pipeline systems, various control inserts are incorporated in the control valves, which reduce the pressure, reduce the flow rate within the control valve and thereby minimize the development of cavitation. However, the pressure differential often cannot be reduced completely free of cavitation by means of the control insert.

SUMMARY

One aspect of the disclosure relates to a control or shutoff valve which permits improved cavitation reduction.

Expedient embodiments and advantageous modifications are also disclosed.

At least one feed channel leading to the valve seat to supply a pressure medium is arranged in the housing in the control or shutoff valve according to the invention. Water or another pressure medium with higher pressure can be supplied to the throttling gap on the valve seat via the feed channel. The pressure can therefore be raised in the throttling gap and the tendency toward cavitation reduced. The at least one feed channel leads to a valve seat ring provided with outlet openings on the housing, the outlet openings of the valve seat ring being arranged so that they discharge upstream of a closure seal in a closed position of the shutoff element.

The valve seat ring expediently has a distributor channel connected to the outlet openings and to the at least one feed channel.

The closure seal can be arranged on the housing or the shutoff element.

The outlet openings can expediently discharge in the flow direction or at an angle to the flow direction of the medium flowing through the housing. The outlet openings can be arranged symmetrically or asymmetrically relative to the valve seat ring.

The at least one feed channel is preferably connected via a line to a branch opening of the housing on the feed side. The medium flowing through the control or shutoff valve can be taken off at a location of higher pressure and sent via the line to a zone of low pressure. The line can be a separate component fastenable via screw connections or similar connections on the housing in the manner of a branch line. The line can thereby be simply maintained and replaced as required. However, the line can also be integrated in the housing.

The control or shutoff valve according to the invention can be designed both in the basic form a "slide" or also in the form of a "valve" according to DIN EN 734-1.

BRIEF DESCRIPTION OF THE DRAWINGS

Additional details and advantages of the invention are apparent from the following description of a preferred embodiment example with reference to the drawings. In the drawings.

DETAILED DESCRIPTION

Figure 1:
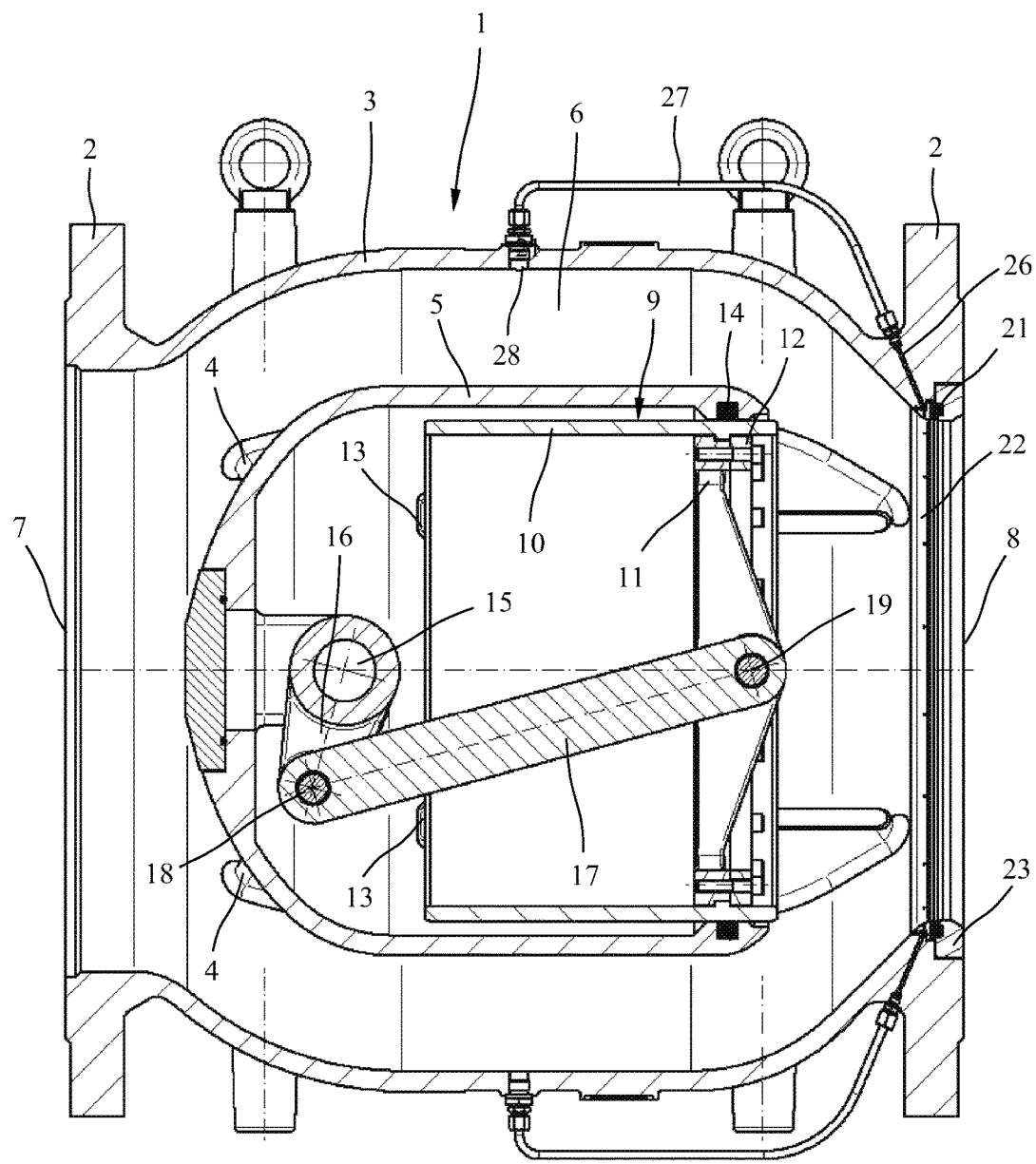
FIG. 1 shows a longitudinal section through a control valve designed as a plunger valve in an opened position.
Figure 2:
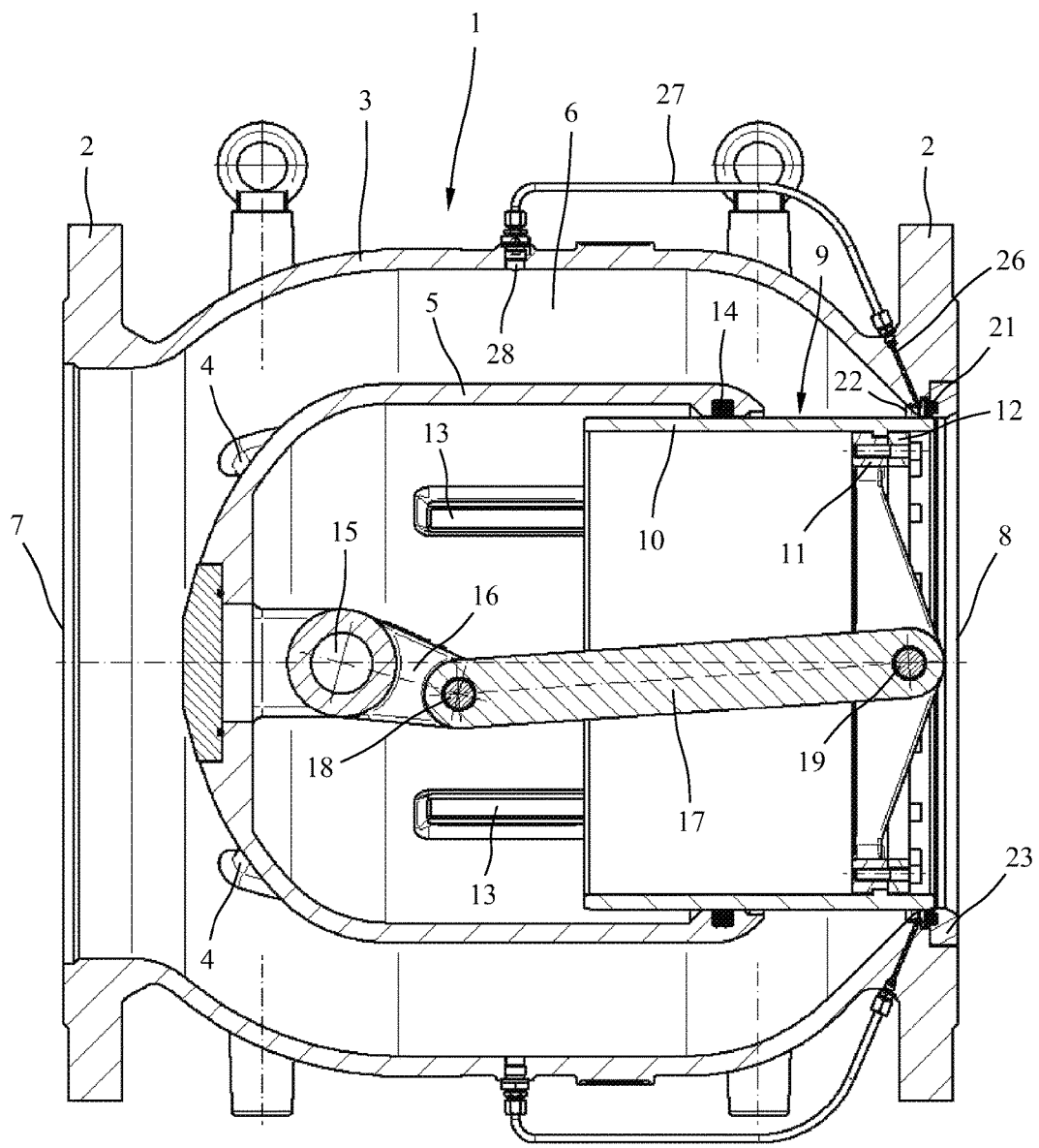
FIG. 2 shows a longitudinal section through the plunger valve depicted in FIG. 1 in a closed position.

A longitudinal cross section through a control valve designed here as a plunger valve to control water flow or to control water pressure is shown in different views in FIGS. 1 and 2. The depicted plunger valve contains a housing 1 preferably consisting of ductile cast iron, which has an outer part 3 provided with connection flanges 2 and an inner guide part 5 supported on the inside of outer part 3 via holding ribs 4. An annular channel 6 is delimited between the outer part 3 and the inner guide part 5 of housing 1, through which water or another medium can flow from a feed 7 to a discharge 8 of housing 1.

As follows from FIGS. 1 and 2, a closure element 9 designed here as a closure piston is guided to move axially in the inner guide part 5 of housing 1 open toward discharge 8. The passage through annular channel 6 can be controlled by axial displacement of the piston-like closure element 9. The piston-like closure element 9 in the depicted embodiment has a closure bushing 10, a connecting rod bearing 11 and a retaining ring 12 to fasten the connecting rod bearing 11 to the closure bushing 10. The closure bushing 10 can be moved axially within the guide part 5 via piston guide strips 13 and guided in sealed fashion radially relative to guide part 5 via a seal 14 designed here as a four-lip seal (quad-ring).

The closure element 9 is driven in its longitudinal movement by a crank mechanism with a drive crank 16 fastened to a drive shaft 15 and a connecting rod 17 articulated with the drive crank 16. The connecting rod 17 is articulated on one end via a crank pin 18 to the drive crank 16 and on its other end via a crank pin 19 to the connecting rod bearing 11. By rotation of drive shaft 15, the piston-like closure element 9 can be moved between a retracted, open position depicted in FIG. 1 and a closed position depicted in FIG. 2.

Figure 3:
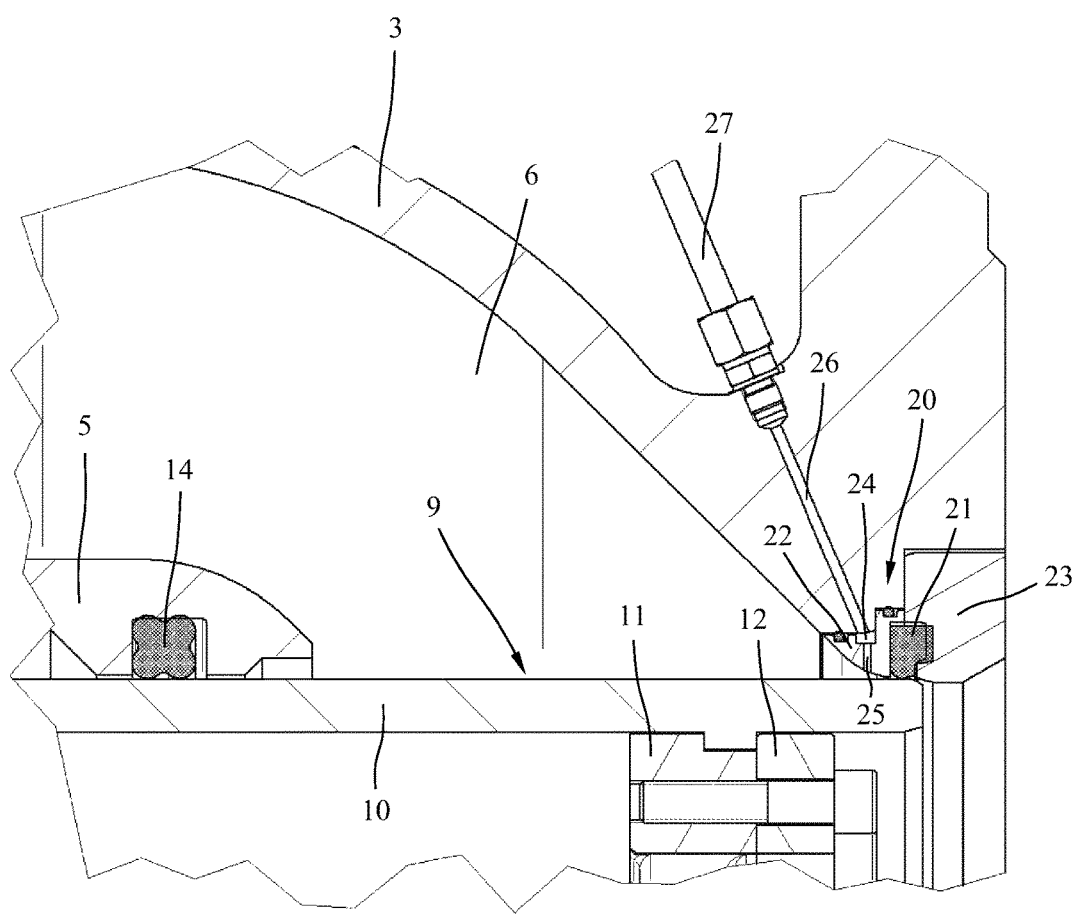
FIG. 3 shows a detail view of a valve seat of the plunger valve depicted in FIG. 1 in a cross section.
Figure 4:
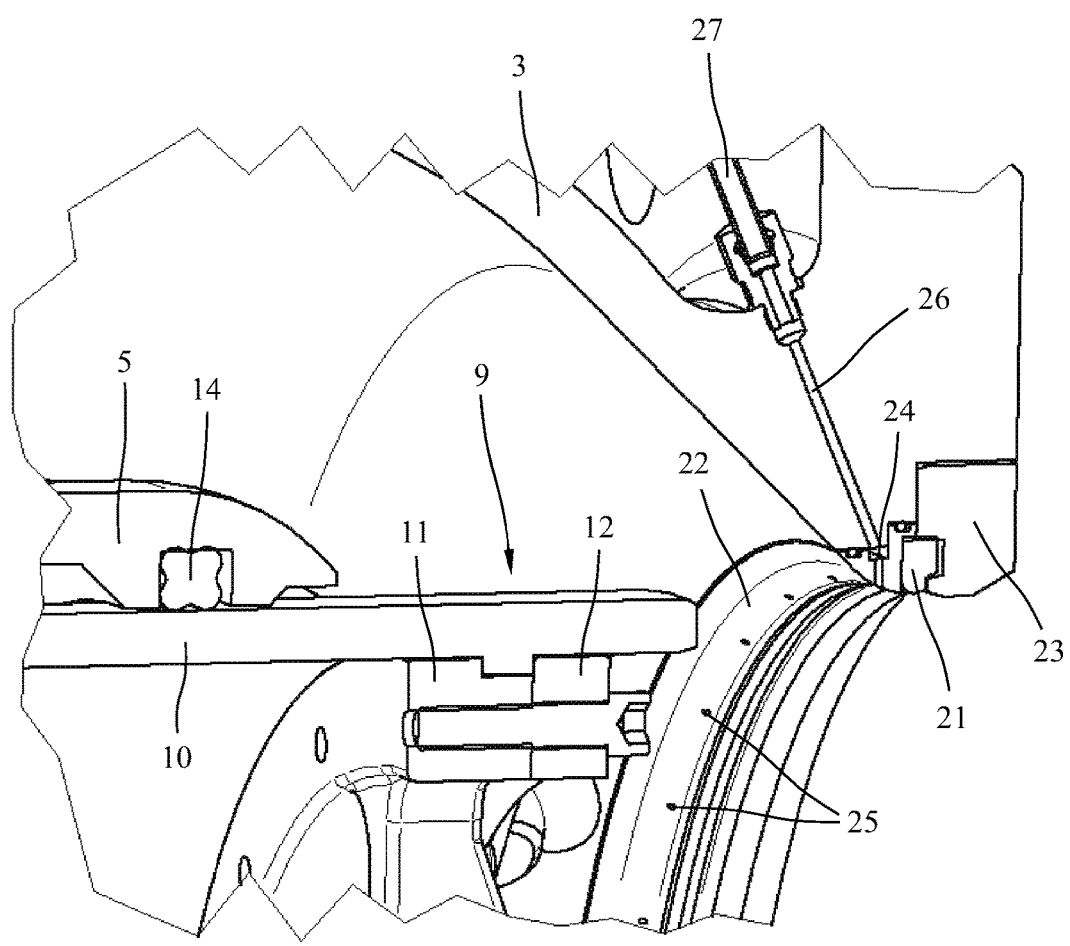
FIG. 4 shows a detail view of the valve seat of FIG. 3 in a perspective view.

The housing 1 of the plunger valve depicted in FIGS. 1 and 2 contains a valve seat 20, shown enlarged in FIG. 3, against which the closure bushing 10 of closure element 9 stops in sealed fashion in the closed position via a closure seal 21 In the closed position of closure element 9 the outer end of the closure bushing 10 pointing to outlet 8 lies against the closure seal 21. The annular closure seal 21 designed as a profile seal in the depicted valve seat 20 is tightened between a valve seat ring 22 and a retaining ring 23 fastened in the connection flange 2 of housing 1 on the discharge side. The valve seat ring 22 arranged in the flow direction in front of the closure seal 21 has a distributor channel 24 running as an annular groove on its outside, from which several outlet openings 25 distributed on the periphery of valve seat ring 22 and discharging on the inside of valve seat ring 22 branch off. Several feed channels 26 designed here as holes are arranged in the outer part 3 of housing 1 to supply liquid to distributor channel 24 of valve seat ring 22. However, only one feed channel 26 can also be provided. Lines 27 that branch off from branch openings 28 on the feed side are connected to the outer ends of feed channels 26. The branch openings 28 can be arranged in the vicinity of the connection flange 2 on the inflow side.

Figure 5:
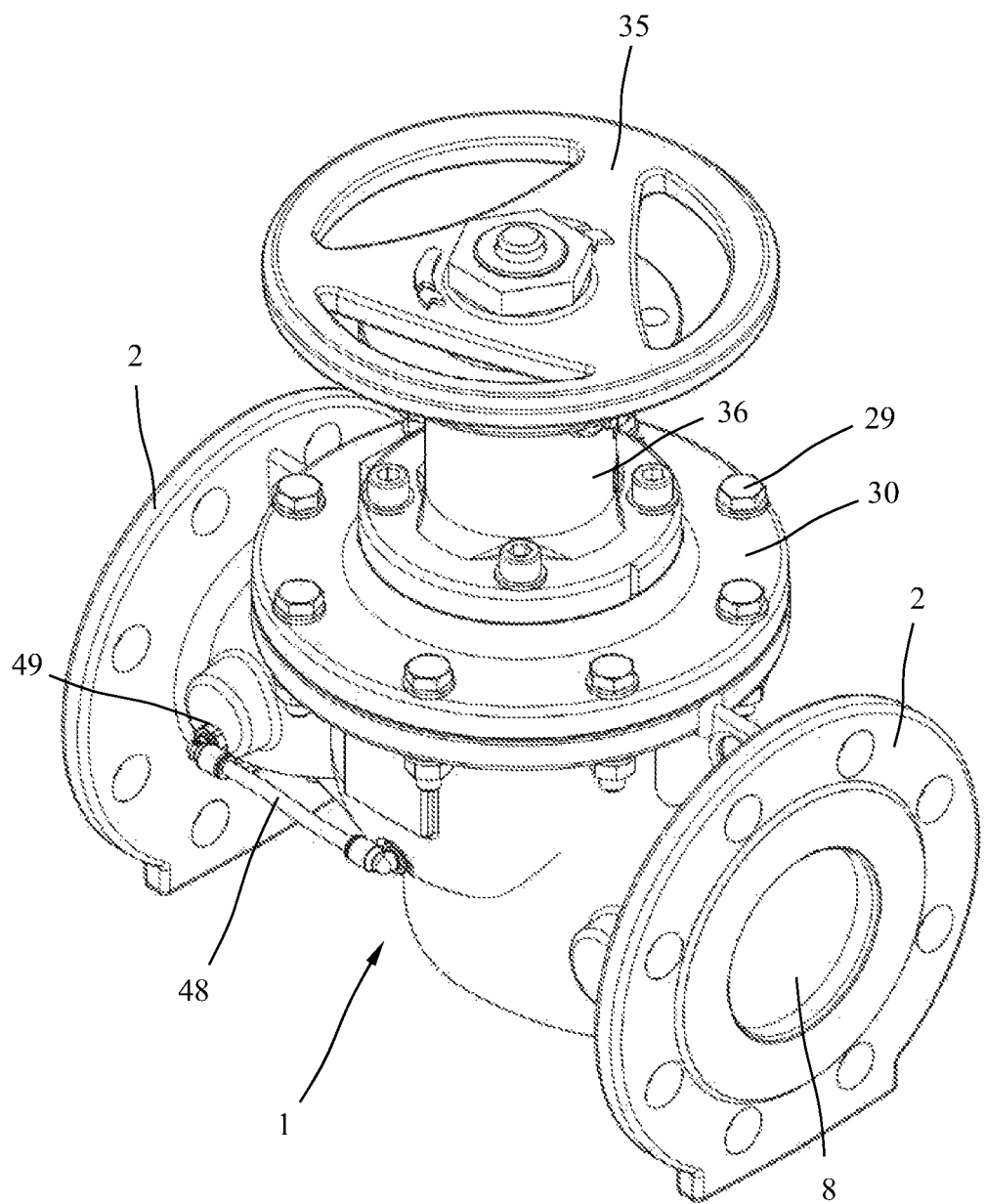
FIG. 5 shows another embodiment example of a control valve in a perspective view.
Figure 6:
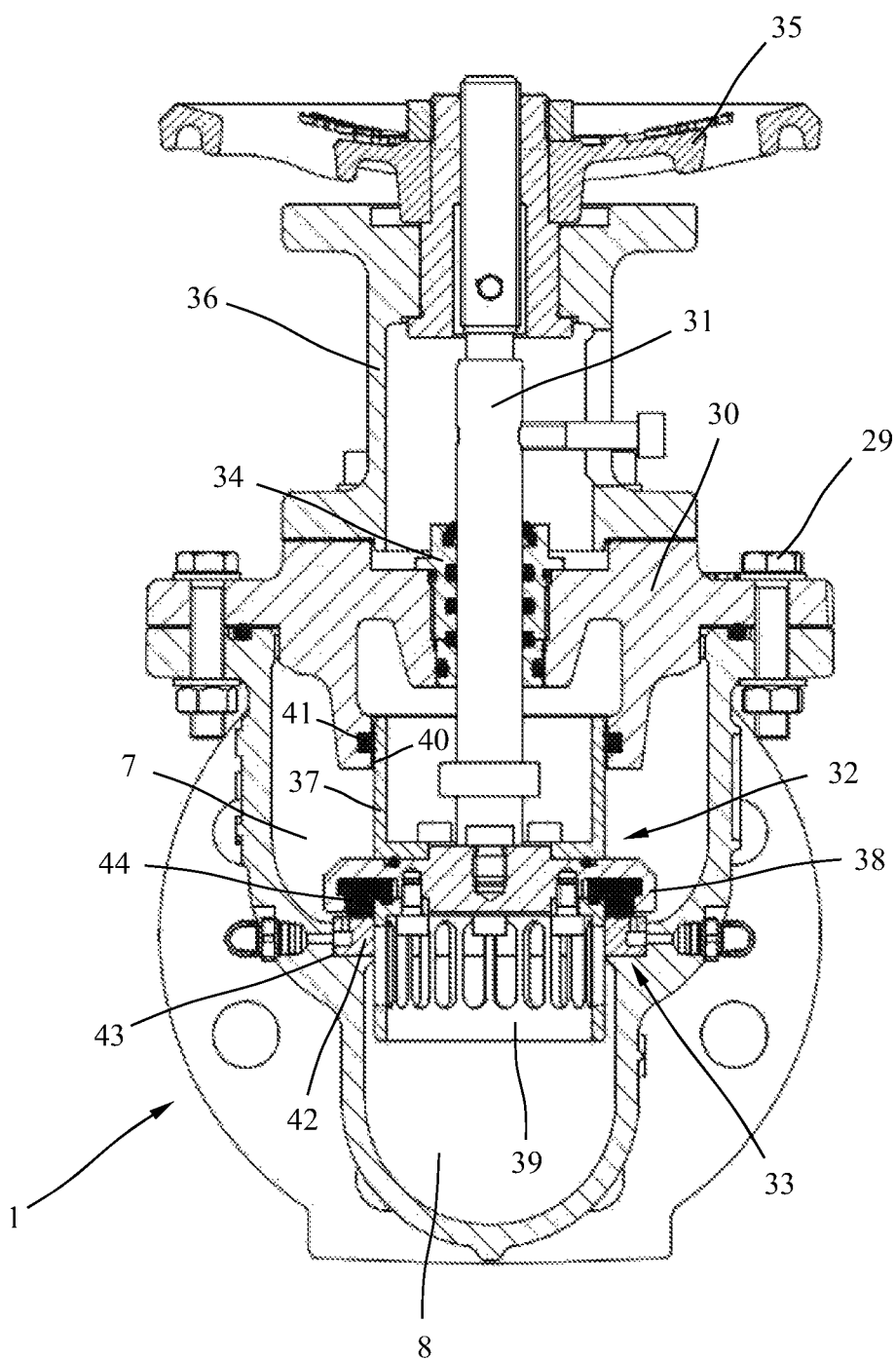
FIG. 6 shows the control valve of FIG. 5 in a cross section.
Figure 7:
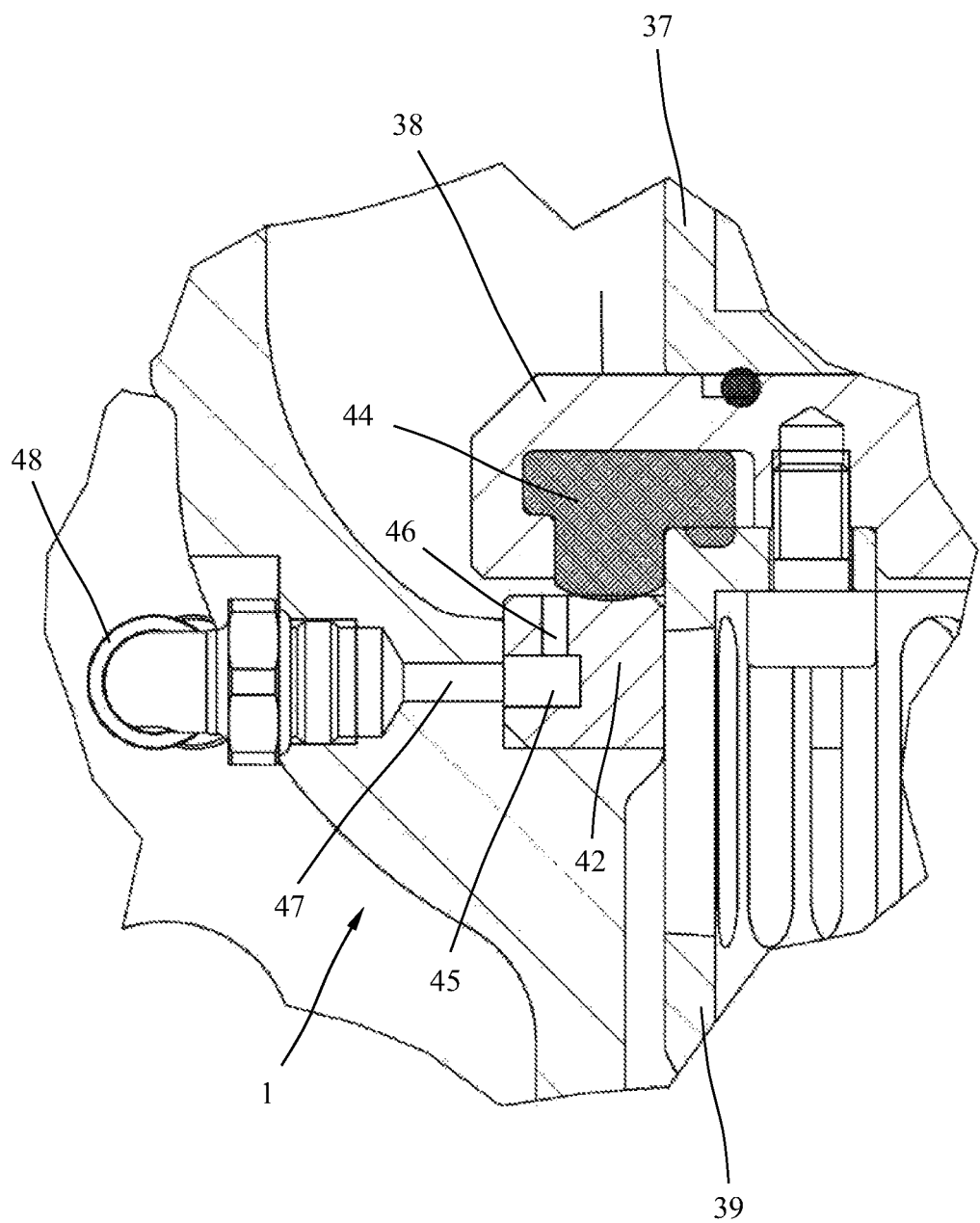
FIG. 7 shows a detail view of a valve seat of the control valve depicted in FIG. 6.

Another embodiment example of a control valve is depicted in FIGS. 5 to 7. The housing 1 provided with the connection flanges 2 in this control valve has a cover 30 fastened on its top by means of screws 29. A drive spindle 31 depicted in FIG. 6 is mounted to rotate via a spindle bearing 34 and is sealed radially in cover 30 for displacement of a closure element 32 relative to a valve seat 33 arranged on housing 1. The drive spindle 31 in the depicted embodiment can be rotated via a hand wheel 35, which is mounted in an attachment sleeve 36 fastened to cover 30 and connected to drive spindle 31. Displacement of the drive spindle 31, however, can also occur via other drives. The housing 1 also has a feed 7 arranged here upstream of valve seat 33 and a discharge 8 arranged downstream of valve seat 33. In contrast to the plunger valve depicted in FIGS. 1 to 3, however, the closure element 32 in this control valve cannot be moved in the axial direction of the inlet and outlet openings in the two connection flanges 2 but across the axial directions of the inlet and outlet openings in the two connection flanges 2.

The closure element 32 depicted in FIG. 6 has a sleeve-like guide part 37 and a disk-like closure plate 38 with a slotted sleeve 39 fastened to its bottom. The closure element 32 can be moved via the sleeve-like guide part 37 in a corresponding opening 40 of cover 30 and guided radially sealed via a seal 41. The valve seat 33 is formed here by a valve seat ring 42, which is inserted into a corresponding recess 43 of housing 1. In contrast to the embodiment of FIGS. 1 to 3, the valve seat ring 42 here is not arranged parallel to the connection flanges 2 of housing 1 but at right angles to them. Another difference relative to the embodiment of FIGS. 1 to 3 is that the closure seal 44 provided here is not fastened to housing 1, but to the closure plate 38 of closure element 32. The closure seal 44, however, could also be fastened to the valve seat ring 42.

It follows from FIG. 7 that this valve seat ring 42 also contains on its outside a distributor channel 45 running as an annular groove and several outlet openings 46 branching off from distributor channel 45. The outlet openings 46 are also arranged here so that they discharge upstream of the closure seal 44 in the depicted closed position of the shutoff element 9. At least one feed channel 47 connected to distributor channel 45 is also provided here in housing 1 to supply a pressure medium to the distributor channel 45. A line 48 depicted in FIG. 5 is also connected to the outer ends of the feed channel 47, which branches off from a branch opening 49 of housing 2 on the feed side. The branch opening 49 is arranged in the vicinity of the connection flange 2 on the feed side.

What is claimed is:

1. A control valve comprising:
   a housing;
   a valve seat arranged within the housing between a feed and a discharge;
   a shutoff element arranged within the housing, the shutoff element adjustable relative to the valve seat;
   a valve seat ring including outlet openings around a periphery thereof; the outlet openings arranged to discharge upstream of a closure seal when the shutoff element is in a closed position;
   at least one feed channel arranged in the housing; and
   a detachable line connecting a branch opening in the housing to the at least one feed channel;
   wherein arrangement of the detachable line enables medium flowing through the housing to be removed at areas of higher pressure and diverted through the detachable line to areas of lower pressure to reduce cavitation in the medium.

2. The control valve according to claim 1, wherein the detachable line is arranged outside the housing.

3. The control valve according to claim 1, wherein the at least one feed channel is connected to an opening in the housing on an inflow side of the valve seat.

4. The control valve according to claim 1, wherein arrangement of the at least one feed channel in the housing enables a pressure medium flowing to the valve seat ring through the at least one feed channel to raise pressure at the valve seat ring to reduce cavitation in a medium flowing through the housing from the feed to the discharge.

5. The control valve according to claim 1, wherein the valve seat ring comprises a distributor channel running as an annular groove on an outside surface, the distributor channel connected to the outlet openings and to the at least one feed channel.

6. The control valve according to claim 1, wherein the closure seal is arranged on the housing.

7. The control valve according to claim 1, wherein the closure seal is arranged on the shutoff element.

8. The control valve according to claim 1, wherein the outlet openings are arranged to discharge in a flow direction of the medium flowing through the housing.

9. The control valve according to claim 1, wherein the outlet openings are arranged at an angle to a flow direction of the medium flowing through the housing.

10. The control valve according to claim 1, wherein the outlet openings are arranged symmetrically relative to the valve seat ring.

11. The control valve according to claim 1, wherein the outlet openings are arranged asymmetrically relative to the valve seat ring.

12. The control valve according to claim 1, wherein the shutoff element is a closure piston having an axially-movable closure sleeve.

13. The control valve according to claim 1, wherein the shutoff element includes a closure plate shaped as a disk.

14. The control valve according to claim 1, wherein the branch opening is arranged adjacent to a connection flange on a feed side of the housing.

* * * * *